United States Patent [19]

Wallace

[11] 4,285,378
[45] Aug. 25, 1981

[54] THREAD LOCK

[75] Inventor: Richard B. Wallace, Bloomfield Hills, Mich.

[73] Assignee: The Oakland Corporation, Troy, Mich.

[21] Appl. No.: 903,738

[22] Filed: May 8, 1978

Related U.S. Application Data

[63] Continuation of Ser. No. 745,796, Nov. 29, 1976, abandoned.

[51] Int. Cl.³ .......................... F16B 39/34; B05D 3/02
[52] U.S. Cl. ..................................... 411/258; 10/10 P; 427/195; 427/216
[58] Field of Search ................... 151/7, 14.5; 85/1 C; 427/195, 216, 388 B, 388 D, 388 R, 386; 10/10 P, 86 A

[56] References Cited

U.S. PATENT DOCUMENTS

| 2,550,232 | 4/1951 | Donnell et al. | 427/388 D X |
| 3,498,352 | 3/1970 | Duffy | 151/7 |
| 3,568,746 | 3/1971 | Faroni et al. | 151/7 |
| 3,723,157 | 3/1973 | Druin | 427/386 X |
| 3,731,724 | 5/1973 | Dorflinger | 151/7 |
| 3,737,355 | 6/1973 | Epstein et al. | 151/14.5 X |
| 3,784,435 | 1/1974 | Bagheri et al. | 151/7 X |
| 3,787,222 | 1/1974 | Duffy | 151/7 X |
| 3,830,902 | 8/1974 | Barnes | 151/7 X |
| 3,893,496 | 7/1975 | Wallace et al. | 151/14.5 |
| 4,120,993 | 10/1978 | Duffy et al. | 151/7 X |

Primary Examiner—Ramon S. Britts
Attorney, Agent, or Firm—Whittemore, Hulbert & Belknap

[57] ABSTRACT

A friction material in the form of a substantial percentage of cured or polymerized powdered nylon and/or teflon resin is mixed in a binder which is mainly fluid epoxy resin and an activator therefor, and applied to the threaded portion of a threaded member. The epoxy resin is reacted by the activator at room temperature or at least at a temperature well below the fusion point of the nylon or teflon particles to bond the powder particles together and to establish a bond to the thread surfaces to form a substantially uniform mixture of the powder particles and binder and to form a substantially solid, non-tacky, resilient friction element strongly bonded to the thread surfaces and frictionally interfering with the threads of a mating threaded member.

18 Claims, 3 Drawing Figures

THREAD LOCK

CROSS REFERENCE TO RELATED APPLICATION

The present application is a continuation-in-part of my prior co-pending application, Ser. No. 745,796 filed Nov. 29, 1976, now abandoned.

PRIOR PRACTICES

Prior to the present invention, a friction thread lock consisting essentially of nylon plastic fused to a limited area of a thread surface has been used commercially. This friction thread lock has been referred to as a "patch" type, to distinguish it from other prior thread locks, also using nylon, in which nylon buttons or strips were set into recesses or slots cut into the threaded surfaces. The patch type had the advantage over prior practices that it eliminated the machining step necessary to form the recess or slot to receive the nylon insert.

Villo U.S. Pat. No. 3,093,177 discloses the formation of a nylon patch on a threaded metal member by a process in which a nylon pellet is mechanically applied to the threaded surface by the application of heat (as for example, 450° F.) and pressure (as for example 100 psi), and fused to the thread.

The basic method as taught by Villo has been modified to provide for depositing a stream of nylon particles onto a hot thread to fuse the particles on deposition, or to fuse a mass of particles while retained on the threads, and inventions have been patented which provide automatic equipment for mass production of the product. Examples of such improvements include:

Newnon: U.S. Pat. No. 4,035,859
Newnon: U.S. Pat. No. 3,975,787
Barnes: U.S. Pat. No. 3,830,902
Duffy: U.S. Pat. No. 3,787,222
Epstein, et al: U.S. Pat. No. 3,737,355

In all of these, the inventive concept of melting or fusing the nylon particles (or equivalent, such as teflon particles), is carried forward as the major premise on which the improvements are based, whereas in the present method the patch is applied cold and no temperature approaching the melting or fusing temperature of nylon is used.

DETAILED DESCRIPTION

Figure 1:
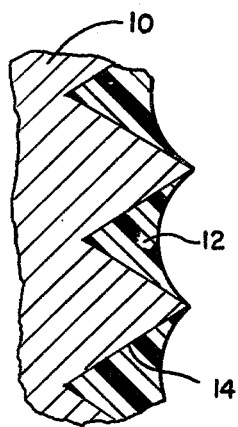
FIG. 1 is an enlarged fragmentary section view showing the friction material in a thread groove.

In accordance with the present invention, a fluid material for application directly to the thread surface of a metal threaded body, as for example a conventional bolt, is prepared by mixing a very substantial percentage of a cured or reacted resin powder preferably nylon and/or teflon, in a fluid binder, preferably unreacted epoxy resin and an activator therefor selected to react or polymerize to form an essentially solid, non-tacky, resilient deposit which is adapted to adhere tightly to the metal thread surfaces to which it is applied. The powder particles constitute 50-95% by volume of the deposit. In fact, the upper limit is determined by the amount of powder which can be thoroughly wetted by the epoxy and activator, prior to cure, with sufficient excess to provide a continuous bond to the thread surfaces.

The epoxy resin when cured binds the particles of the previously cured powdered resin permanently into an essentially solid continuum in which the epoxy resin substantially fills the voids between the powder particles, binds the particles together, and provides an exceptionally strong bond between the deposit and the metal surfaces of the threads. This deposit is subjected to only moderate heating, and is referred to as a "cold patch" to emphatically distinguish from the product in which nylon powder is fused to the threaded body at temperatures of above 450° F.

An epoxy resin suitable for this application is one prepared by reacting bisphenol A and epichlorohydrin to an epoxide value of 180-190, or a molecular weight of 360-380. The hydroxyl content would be very low. This resin is cured by reacting with diethylene triamine 7-8 parts of amine for each 100 parts of resin. While the cure might be at room temperature, it is preferred to accelerate the cure by heating the deposit moderately, as for example to about 160° F. If desired, the curing agent (activator) can be an amine terminated polyamid (50—50 parts by weight of epoxy-amine) with an amine value of 95-100.

The application of the epoxy-resin powder mixture to the metal thread surface is accomplished simply by depositing a measured amount of the fluid mixture to a portion of the thread surface at one side thereof, and preferably between the ends thereof. The fluidity of the mixture will depend largely on the percentage of the dry resin powder included therein, and this is of course taken into account on application of the mixture to the thread surface.

The amount of material is selected to form a deposit extending over a few adjacent thread convolutions, as for example, three of four, and usually to extend circumferentially of the threaded surface for a limited angular extent, as for example, about 90°. In a very satisfactory practice of the present invention, the deposit had approximately equal axial and circumferential dimensions. Alternatively of course the axial dimension may substantially exceed the circumferential dimension, so that the deposit functions to provide a friction lock similar to that provided by setting an elongated nylon strip into an axially extending slot.

Also of course the fluid deposit may be made in such a way as to extend completely around the threaded member, as for example in a relatively narrow (i.e. 3 or 4 threads) annular band.

It is desirable to provide the deposit in such a way as to prevent the initial deposit from extending radially beyond the crests of the threads of the threaded member. This requires that the initial deposit flow into the thread spaces, before the epoxy resin is permitted to cure. This may be accelerated by exposure to hot air at about 160° F.

In a preferred practice of the present invention, a mixture of about 90% by volume of cured or polymerized and powdered dry nylon resin was uniformly mixed into a liquid epoxy resin in unreacted condition, together with an activator for the epoxy resin. In general, the amount of epoxy resin is preferably limited to that necessary to insure that all particles of the powder are wetted, and that there is sufficient epoxy resin to form a continuous bond with the metal surface of the thread. In a successful practice of the invention, the nylon particles had a particle size of about 0.004 inches.

The mixture of uncured epoxy, resin, activator and nylon particles was quite thick. It was applied in predetermined amounts to predetermined areas at one side of the threaded member.

In a continuous process, the mixture is applied to the threaded members as they advance to provide a patch area in which the thread spaces or grooves are substantially filled, but the material does not extend radially beyond the crests of the threads on the patch area. The threaded members continue to advance beyond the station at which the material is applied into an elongated heating tunnel where they are subjected to hot air at a temperature of about 160° F.

The tunnel in a particularly effective practice of the invention was about thirty feet long, and the treated threaded members were advanced at a rate of ten feet per minute, thus establishing a heating period of three minutes. The mixture when first subjected to heating undergoes an increase in fluidity, and may flow to slightly enlarge the area of application and to cause the surface of the deposit to recede somewhat below the crests of the threads, leaving a concave surface substantially tangent to the thread surfaces at the crests thereof. Thereafter, the material passes through a "gel" state and then cures to provide a non-tacky surface. This permits the threaded members to be boxed or otherwise agglomerated or massed together without sticking to each other, and the final cure takes place thereafter.

In a continuous process, the threaded articles are advanced horizontally in a series in which the threaded members are positioned with their axes vertical past an application station. At this station a quantity of the mixed material is applied to one side of the threaded members in a manner to fill the thread grooves over a predetermined patch area, while preventing extension of the material radially outward of the crests of the threads.

Thereafter, the members are advanced through a heated tunnel where they are exposed to heated air in the tunnel. In a successful practice of the invention, the air in the tunnel is heated to a temperature of 150°-250°, preferably about 160°. The tunnel is thirty feet in length and the rate of advance is ten feet per minute.

As the material is first rendered more fluid by initial heating, it flows to a very limited extent along the thread grooves or spaces, with the result that at the circumferentially bounding edges, the friction material in the thread grooves is of tapered thickness, providing what may be referred to as a feathered edge for a somewhat gradual engagement with the threads of a mating member.

The deposit thus formed has physical properties not significantly different from the physical properties of the previously described solid nylon patch fused to the thread surface. The epoxy resin forms an unexpectedly strong and permanent bond with the metal surface, and bonds the nylon particles together to form a mass which is an essentially uniform mixture of the epoxy and powder particles. The physical properties of the epoxy-nylon mixture are sufficiently close to those of the nylon so that the friction locking effect is substantially identical to that of a solid nylon patch.

The present invention thus provides a manufacturing technique which eliminates the necessity for the application of high temperatures and high pressure in the application of a localized area of friction material to an unmodified metal thread, without sacrificing the advantages of the so-called patch type deposit over practices prior thereto. Generally, production rates exceed those of the patch type process, largely because of the substantially lower temperatures (160° F. v. 590° F.).

The invention as thus far described refers primarily to an externally threaded member, such as a bolt, screw or stud. It will be apparent, however, that the material may be applied in a similar manner to an internally threaded member such as a nut.

The application of the material and the treatment as described above results in the formation of a patch of friction material at one side of the threaded member. The material is made up mostly of previously cured solid powdered nylon and/or teflon resin, in which the particles are received in and form a part of an essentially solid continuum.

The mixture of uncured liquid epoxy resin, the activator therefor, and the preferably nylon powder, while capable of curing at room temperature, has a pot life permitting it to stand for some time, as for example, two or three hours. This permits a batch to remain over a lunch hour, or the like, and still be usable. However, after application in fluid condition, its cure is accelerated by brief moderate heating, as for example, for three minutes at about 160° F., so that at the end of this time, the cure has progressed to the point, at least as to exposed surface portions, that the deposit is no longer tacky and the articles may be boxed or otherwise agglomerated without sticking together.

In FIG. 1 a threaded member 10 has the friction material 12 deposited in thread grooves 14. It will be noted the material does not project beyond the crests of the threads but is substantially tangent to the sides adjacent the crests.

Figure 3:
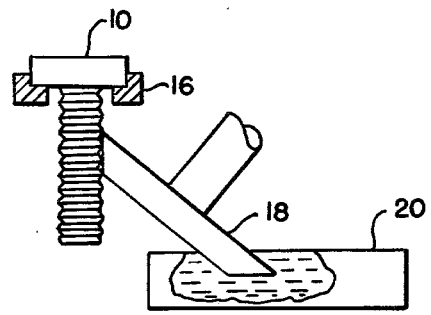
FIG. 3 is an elevational view looking in the direction of arrows 3—3 in FIG. 2.
Figure 2:
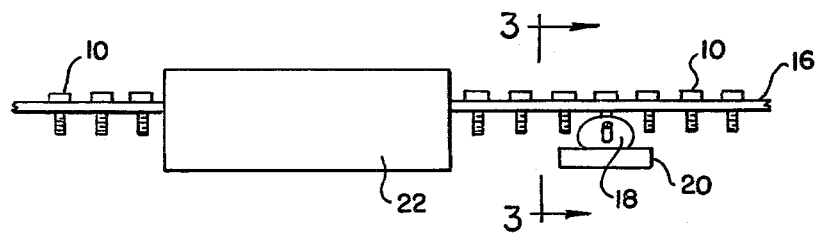
FIG. 2 is an elevational view illustrating manufacture of the friction threaded members.

In FIG. 2, a series of members 10 are advanced along a conveyor 16, in the manner shown in my prior copending application Ser. No. 675,789, past a generally beveled applicator roll 18, which is inclined as best seen in FIG. 3 to dip into supply tray 20 and to engage the sides of members 10. After application of the material by the roll 18, the articles pass through a horizontal heating tunnel 22, where the fluid deposit is caused to initiate its cure to the extent that the surfaces thereof are non-tacky.

If it is desired to provide deposits or patches which extend completely around the threaded article, it will be understood that rollers such as 18 may be provided at both sides of the supports 16 on which the members 10 advance. Since the deposit is fluid, it flows around the threads to cause the two deposits to merge into a single substantially annular deposit.

From the foregoing, it will be apparent that the friction deposit is in the form of solid separate particles of nylon or teflon contained in a substantially solid continuum of which the remainder is cured epoxy resin, and that the friction material is adhered to the thread surfaces by substantially continuous bond of epoxy resin cured in situ. The patch is homogeneous throughout.

The method of making the articles represents a substantial advance in the art, since it is not necessary to melt or soften the nylon or teflon. The particles in the deposit are held by the epoxy, and the entire deposit is adhered to the threads by the epoxy. The application of the material to the articles may be at room temperature. Only mild heating to initiate polymerization of the epoxy to eliminate tackiness is required.

It will be apparent that the nylon or other thermoplastic particles are applied in a process in which they are never brought to a temperature approaching softening, melting, or fusion temperature. Accordingly these particles retain their original shape and physical condition in the patch after the epoxy resin has been cured.

What is claimed is:

1. A metal threaded member having in the thread grooves thereof a solid deposit of friction material effective to provide a frictional resistance to turning of the threaded member in thread-engaging relation to a companion threaded member, said deposit consisting essentially of a body of a uniform mixture throughout of a major proportion of uniformly dispersed discrete particles of pre-cured thermoplastic resin adhered together to form a substantially solid continuum by a bonding resin cured in situ, said bonding resin forming a bond directly between individual particles, substantially filling the spaces between the particles, and also forming an essentially permanent bond to the surfaces of the threads throughout the deposit area.

2. A threaded member as defined in claim 1, in which the deposit is located at one side only of the threaded portion of the member.

3. A threaded member as defined in claim 1, in which the deposit extends completely around the member.

4. A threaded member as defined in claim 1, in which at the boundary edges of the deposit, the radial thickness of the deposited material in the thread grooves diminishes toward the edge to provide a feather edge facilitating engagement with a mating threaded member.

5. A threaded member as defined in claim 1, in which the outer surface of the material in the thread grooves is concave and substantially tangent to the thread surfaces at the crests thereof.

6. A threaded member as defined in claim 1 in which the pre-cured particles are nylon or teflon.

7. A threaded member as defined in claim 1 or 6 in which the bonding resin is epoxy.

8. A threaded member as defined in claim 7, in which the discrete particles constitute 50-95% by volume of the material of the deposit.

9. A threaded member as defined in claim 7, in which the discrete particles constitute about 90% by volume of the discrete particles.

10. The method of making friction threaded members which comprises preparing an essentially fluid uniform mixture of a fluid bonding uncured resin, an activator to promote polymerization thereof, and a major proportion by volume of discrete solid particles of pre-cured theremoplastic resin particles, applying without confinement or pressure and at substantially room temperature a quantity of the mixture to a limited area of the threaded portion of the member so as to form a fluid deposit of substantial depth in the thread grooves throughout the area while preventing extension of the material radially beyond the crests of the threads, and curing the bonding resin in situ at temperatures substantially below the melting point of the pre-cured particles to provide a solid deposit in the form of a substantially solid continuum in which the particles are distributed substantially uniformly throughout the deposit, the bonding resin forms a permanent bond directly between individual particles, substantially fills the spaces between particles, and also forms an essentially permanent bond to the thread surfaces throughout the deposit area.

11. The method as defined in claim 10, in which the bonding resin is epoxy resin, which comprises the step of mildly heating the deposited material to initiate polymerization of the epoxy resin.

12. The method as defined in claim 11, in which the step of heating the deposited material comprises subjecting the threaded article on which the material is deposited to an ambient air temperature of 150°–250° F. to first increase the fluidity of the deposited material and then to initiate polymerization sufficiently to form a non-tacky surface on the deposited material.

13. The method as defined in claim 12, which comprises advancing a series of threaded members with their axes vertical as the friction material is deposited.

14. The method as defined in claim 13, and thereafter advancing the members through an elongated horizontal tunnel in which the air is heated to a temperature of 150°–250° F.

15. The method as defined in claim 14, and controlling the rate of advance relative to the temperature and length of tunnel so as to cause only sufficient polymerization of the epoxy resin to produce a non-tacky surface, and finally agglomerating the members while the polymerization of the resin is continued to completion.

16. The method as defined in claim 12, which comprises heating the members for only a few minutes sufficient to form a non-tacky surface on the friction material.

17. The method as defined in claim 10, in which the pre-cured particles are nylon or teflon.

18. The method as defined in claim 10 or 17, in which the bonding resin is epoxy.

* * * * *